United States Patent [19]

Diemer et al.

[11] Patent Number: 4,511,549

[45] Date of Patent: Apr. 16, 1985

[54] PROCESS FOR THE ELIMINATION OF WASTE WATER PRODUCED UPON THE DESULFURIZATION OF COKING OVEN GAS BY MEANS OF WASH SOLUTION CONTAINING ORGANIC OXYGEN-CARRIER, WITH SIMULTANEOUS RECOVERY OF ELEMENTAL SULFUR

[75] Inventors: Peter Diemer; Werner Brake; Rainer Dittmer, all of Essen, Fed. Rep. of Germany

[73] Assignee: Krupp-Koppers GmbH, Essen, Fed. Rep. of Germany

[21] Appl. No.: 396,691

[22] Filed: Jul. 9, 1982

[30] Foreign Application Priority Data

Jul. 10, 1981 [DE] Fed. Rep. of Germany ....... 3127221

[51] Int. Cl.$^3$ .............................................. C01B 17/05
[52] U.S. Cl. .............................. 423/574 R; 423/226; 423/573 R; 210/757; 210/909; 110/238
[58] Field of Search ............... 423/567 R, 567 A, 572, 423/571, 573 R, 573 G, 226, 224, 574 R; 210/909, 719, 721, 757, 761; 110/238

[56] References Cited

U.S. PATENT DOCUMENTS

| 3,035,889 | 5/1962 | Nicklin et al. | 423/226 |
| 3,822,337 | 7/1974 | Wunderlich et al. | 423/224 |
| 4,085,688 | 4/1978 | Smith et al. | 423/224 |
| 4,355,011 | 10/1982 | Weber | 423/226 |

FOREIGN PATENT DOCUMENTS 2411805  7/1979  France ............................. 423/224

OTHER PUBLICATIONS

Translation of French Pat. No. 2,411,805 (see L).

Primary Examiner—Earl C. Thomas
Assistant Examiner—Jeffrey E. Russel
Attorney, Agent, or Firm—Michael J. Striker

[57] ABSTRACT

A process is disclosed for the elimination of waste water falling out with the desulfurization of coking oven gas by means of an organic oxygen carrier—containing washing solution with simultaneous recovery of elemental sulfur. The waste water is decomposed in a combustion chamber in a reducing atmosphere at temperatures between about 1000° and 1100° C. under such conditions that the mole ratio of $H_2S:SO_2$ in the exhaust gas of the combustion chamber amounts to at least 2:1. Sulfur falling out is separated and the sensible heat of the exhaust gas is utilized for steam generation. The cooled and desulfurized exhaust gas is added to the coking oven gas before the pre-cooling. Sulfur falling out from the washing solution in the oxidizer is separated out and lead into the combustion chamber together with the part of the washing solution discharged as waste water from the washing solution circulation. Preferred embodiments include that the sulfur loading of the waste water can amount to up to about 370 kg sulfur per m$^3$ waste water; having the cooling of sulfur—containing exhaust gas leaving the combustion chamber follow in a waste heat boiler and a sulfur condenser heated by pre-heated boiler feed water, from which condenser sulfur is discharged in liquid state.

9 Claims, 1 Drawing Figure

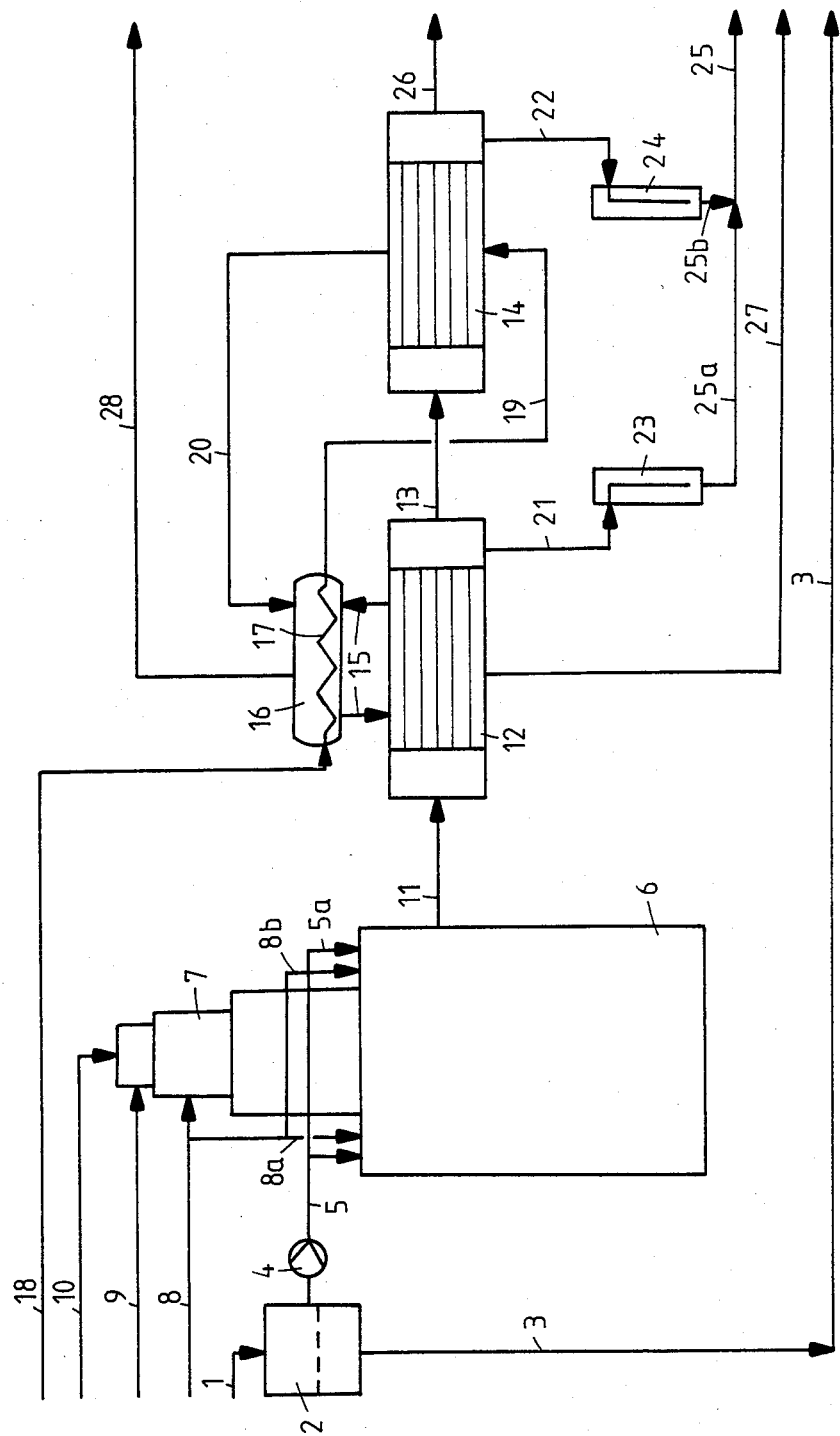

PROCESS FOR THE ELIMINATION OF WASTE WATER PRODUCED UPON THE DESULFURIZATION OF COKING OVEN GAS BY MEANS OF WASH SOLUTION CONTAINING ORGANIC OXYGEN-CARRIER, WITH SIMULTANEOUS RECOVERY OF ELEMENTAL SULFUR

BACKGROUND OF THE INVENTION

The invention concerns a process for the elimination of waste water produced upon upon desulfurization of coking oven gas by means of a washing solution containing organic oxygen carrier, with simultaneous recovery of elemental sulfur. The waste water is decomposed in a combustion chamber in a reducing atmosphere at temperatures between about 1000° and 1100° C. under such conditions that the mol ratio of $H_2S:SO_2$ amounts to at least 2:1 in the exhaust gas produced in the combustion chamber, sulfur present therewith is separated, the sensible heat of the exhaust gas is utilized for steam generation, and subsequently the cooled and desulfurized exhaust gas is added to the coking oven gas before the pre-coolers.

In practice, washing techniques for the desulfurization of the coking oven gas, i.e. mainly the removal of hydogen sulfide, have been predominantly selected which operate with organic oxygen carrier-containing, alkaline or ammoniacal washing solutions. As organic oxygen carrier, mainly quinone or compounds of quinoidal character, such as e.g. hydroquinone, naphthaquinone, anthraquinone, as well as their sulfonic acids, or also other organic compounds with an appropriate redox potential, are used. The processes usually are so performed that the hydrogen sulfide is initially washed out by means of the organic oxygen carrier-containing washing solution in a washer of suitable type of construction. The regeneration of the loaded wash solution then follows with air in so-called oxidizers, whereby the oxygen of the air oxidizes the hydrogen sulfide into sulfur and water by means of the oxygen carrier contained in the washing solution. The sulfur is then normally removed from the wash solution by heating it under pressure to temperatures above the sulfur melting point, whereupon the molten sulfur is separated in liquid state from the washing solution in a separating container, and the washing solution, freed of sulfur, after appropriate cooling is provided again in circulation to the hydrogen sulfide washer.

With such washing operations not only hydrogen sulfide but also hydrocyanic acid contained in the coking oven gas is washed out, and this acid is reacted with the elemental sulfur into rhodenides in the oxidizers. Moreover, with the oxidation of the hydrogen sulfide into sulfur there occur side reactions which lead to sulfates, thiosulfates and other sulfur compounds. In the course of time the wash solution led in circulation becomes enriched in these compounds, whereby the washing effect is impaired.

In order to avoid this enrichment, it is therefore necessary to discard a portion of the washing solution led in circulation, at determined time intervals, and to replace with fresh washing solution. This discarded washing solution cannot however be left in the drainage as waste water. On account of the substances contained in the discarded washing solution, the waste water is namely strongly toxic and oxygen-consuming, so that it requires initially an appropriate working up before it can be led to drainage.

Proceeding from this, DE-PS No. 27 55 830 already describes a process for the elimination of this waste water, in which the waste water to be treated is initially concentrated 70 to 30%, and subsequently is reacted in a combustion chamber under reducing atmosphere with the previously mentioned conditions. Coking oven gas and ammonia vapors resulting from the coking oven gas treatment are burned together in the absence of air to generate the reducing atmosphere.

Whether or not the process described in this reference has properly been proven to work, the present invention is based upon the object of still further improving this known manner of operation and simplifying the same with regard to apparatus. This applies in particular with regard to the previously necessary preconcentrating of the waste water as well as the removal of sulfur from the loaded washing solution.

The process of the above-mentioned type serving for attainment of this object is characterized according to the present invention by the following particulars:

Sulfur in the washing solution is separated in the oxidizers and is led into the combustion chamber together with the portion of the washing solution which is separated from the washing solution circulation as waste water, whereby the sulfur loading of the waste water can amount initially up to about 370 kg sulfur per $m^3$ and the cooling of the sulfur-containing exhaust gas leaving the combustion chamber follows in a waste heat boiler and a sulfur condenser heated with pre-heated boiler feed water, from which the sulfur is discharged in liquid state.

A pre-thickening of the waste water is thus avoided with the process according to the present invention, and at the same time the sulfur which is separated in the oxidizer is led together with the waste water into the combustion chamber. Not only the apparatus and process-technical expenditure for the precondensing of the waste water are avoided thereby, but also the apparatus expenditure for the sulfur recovery is reduced, since the otherwise following thermal separation of the sulfur/washing solution does not take place. A further advantage of the manner of operation according to the present invention is that a highly pure sulfur is obtained which possesses the characteristics of Claus sulfur.

Reaction of the mixture of sulfur and waste water in the combustion chamber follows preferably at a temperature of about 1050° C., whereby the reducing atmosphere in the combustion chamber can be produced not only by combustion of the coking oven gas alone but also by coking oven gas together with the ammonia vapors produced with the coking oven gas treatment, under air exclusion. It is possible herewith for the exhaust air from the oxidizers as well as any exhaust air from the coking oven gas treatment to be led into the combustion chamber.

According to a preferred embodiment the process according to the present invention can moreover be performed in such manner that the sulfur-containing washing solution leaving the oxidizer is filtered to such an extent that yet so much washing solution adheres to the sulfur, present as filter cake, as to have to be disposed as waste water from the washing solution circulation. In this case the produced moist filter cake is led into the combustion chamber.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows a flow scheme of the process according to the present invention, in which there is illustrated only the apparatus parts unconditionally necessary for explanation of the process. The desulfurization plant as well as customary arrangements for coking oven gas treatment are not represented.

DESCRIPTION OF THE PREFERRED EMBODIMENTS

Washing solution leaving the not-represented oxidizers of the desulfurization plant is led through conduit 1 into filter 2, in which the washing solution is filtered to such an extent that the amount of wash solution which thereafter adheres to the filtered sulfur equals the amount that must be removed from the washing solution circulation. The washing solution freed of sulfur is again introduced to the desulfurization plant across conduit 3. The filtered sulfur, together with adhered washing solution, is fed into combustion chamber 6 through conduits 5 and 5a with the aid of pump 4. The burner 7 provided for combustion chamber 6 is provided with the supply conduits 8 for the combustion air (primary air), supply conduit 9 for the ammonia vapors, and supply conduit 10 for the coking oven gas. In addition, the conduits 8a and 8b branch off from supply conduit 8. Additional amounts of air (secondary air) can be blown into combustion chamber 6 through these branching conduits.

The air flowing through conduits 8a and 8b can involve for example exhaust air which is produced in the oxidizers of the desulfurization plant upon regeneration of the loaded washing solution as well as upon coking oven gas treatment. The reducing atmosphere in combustion chamber 6 is produced by combusting in furnace 7 the introduced coking oven gas as well as, if necessary, the ammonia vapors produced upon coking oven gas treatment, under air exclusion, i.e. oxygen deficiency. The sensible heat of the gas produced in this manner is sufficient to decompose the washing solution introduced into combustion chamber 6 through conduits 5 and 5a. The exhaust gas arising thereby is discharged from the combustion chamber through conduit 11 and led initially into the waste heat boiler 12 for pre-cooling, and thereafter across conduit 13 into the sulfur condenser 14 for after-cooling. The waste heat boiler 12 is connected with drying cylinder 16 across a conduit system 15. Heater 17 for the necessary boiler feed water is located in the drying cylinder. The pre- and the after-cooling of the exhaust gas in, respectively, waste heat boiler 12 and sulfur condenser 14 takes place through indirect heat exchange. The boiler feed water necessary for removal of the sensible heat of the exhaust gas is led across conduit 18 into the heater 17, and from there across conduit 19 into the sulfur condenser 14, where it further cools the pre-cooled exhaust gas. The boiler feed water is then led across conduit 20 into the steam cylinder 16. This arrangement makes possible optimal utilization of the sensible heat of the exhaust gas for steam generation. The previous heating-up of the boiler feed water in heater 17 is also necessary in order to avoid hardening of the sulfur in sulfur condenser 14.

With cooling of the exhaust gas occurring in two stages according to the present invention the main amount of the sulfur is recovered from sulfur condenser 14, and only a smaller amount in waste heat boiler 12. The sulfur is discharged in liquid state through conduits 21 and 22 and led subsequently across immersion pots 23 and 24 as well as conduits 25a and 25b to conduit 25. The obtained sulfur is introduced across conduit 25 to its further use as so-called production sulfur. The cooled and desulfurized exhaust gas meanwhile leaves sulfur condenser 14 through conduit 26, to be added to the coking oven gas before the pre-cooling. The residue is discharged across conduit 27 from the waste heat boiler 12. The saturated vapor from drying cylinder 16 can be discharged across conduit 28 and led to its further use.

EXAMPLE

In the following process example the given technical data is for a plant in which waste water, in connection with desulfurization of 80,000 $m_n^3$ coking oven gas according to the so-called Perox process, as well as the sulfur produced therewith, are treated.

In part I of the operational example the ammonia vapors flowing out upon coking oven gas treatment are combusted together with coking oven gas in combustion chamber 6 under air exclusion.

In part II, in contrast, under otherwise similar conditions, a combustion of the ammonia vapors is avoided, so that they can be introduced to another use. In this case the reducing atmosphere in combustion chamber 6 is obtained exclusively through the combustion of coking oven gas under air exclusion.

The different conduits of the plant supply or discharge as follows:

|     | PART I |     |
| --- | --- | --- |
| (a) | Through conduits 5 and 5a | |
|     | 1.5 m³/h waste water, about 25° C. | |
|     | containing: NH₃ (free) | about 17.0 g/l |
|     | H₂S | ca. 0.42 g/l |
|     | CO₂ | ca. 15.4 g/l |
|     | (NH₄)₂SO₄ | ca. 21 g/l |
|     | (NH₄)₂S₂O₃ | ca. 133 g/l |
|     | NH₄CNS | ca. 197 g/l |
|     | 551.2 kg/h sulfur, about 25° C. | |
| (b) | Through conduit 10 | |
|     | 1,168 $m_n^3$/h coking oven gas, 25° C. | |
|     | $H_u = 19,854$ kJ/$m_n^3$ | |
| (c) | Through conduit 9 | |
|     | 882 $m_n^3$/h NH₃—vapor, 70° C. | |
| (d) | Through conduit 8 | |
|     | 7,382 $m_n^3$/h air, 25° C. | |
| (e) | Through conduit 11 | |
|     | 8,242.8 $m_n^3$/h exhaust gas, about 1050° C. | |
|     | 3,020 kg/h steam, about 1050° C. | |
| (f) | Through conduit 26 | |
|     | 7,994 $m_n^3$/h exhaust gas, about 125° C. | |
|     | $H_u = 1,436$ kJ/$m_n^3$ | |
|     | 3,020 kg/h steam, about 125° C. | |
| (g) | Through conduit 25 | |
|     | about 698.5 kg/h sulfur | |
| (h) | Through conduit 28 | |
|     | about 6.9 t/h saturated steam, 14 bar | |
| (i) | Through conduit 18 | |
|     | about 7.6 t/h boiler feed water, 104° C. | |
| (k) | Through conduit 27 | |
|     | about 0.7 t/h residue, 195° C. | |
|     | PART II | |
| (a) | Through conduits 5 and 5a | |
|     | 1.5 m³/h waste water, ca. 25° C. | |

|     |     |     |     |
| --- | --- | --- | --- |
|     | containing: | NH$_3$ (free) | about 17.0 g/l |
|     |     | H$_2$S | about 0.42 g/l |
|     |     | CO$_2$ | about 15.4 g/l |
|     |     | (NH$_4$)$_2$SO$_4$ | about 21 g/l |
|     |     | (NH$_4$)$_2$S$_2$O$_3$ | about 133 g/l |
|     |     | NH$_4$CNS | about 197 g/l |
|     | 547.5 kg/h sulfur. about 25° C. | | |
| (b) | Through conduit 10 | | |
|     | 842.6 m$^3{}_n$/h coking oven gas, 25° C. | | |
|     | H$_u$ = 19,854 kJ/m$^3{}_n$ | | |
| (c) | Through conduit 9 | | |
|     | not used | | |
| (d) | Through conduit 8 | | |
|     | 5,784.5 m$_n{}^3$/h air, 25° C. | | |
| (e) | Through conduit 11 | | |
|     | 5,824.9 m$_n{}^3$/h exhaust gas, about 1050° C. | | |
|     | 2,329 kg/h steam, about 1050° C. | | |
| (f) | Through conduit 26 | | |
|     | 5,581.81 m$_n{}^3$/h exhaust gas, about 125° C. | | |
|     | H$_u$ = 591.2 kJ/m$_n{}^3$ | | |
|     | 2,329 kg/h steam, about 125° C. | | |
| (g) | Through conduit 25 | | |
|     | about 686.3 kg/h sulfur | | |
| (h) | Through conduit 28 | | |
|     | about 5.3 t/h saturated steam, 14 bar | | |
| (i) | Through conduit 18 | | |
|     | about 5.8 t/h boiler feed water, 104° C. | | |
| (k) | Through conduit 27 | | |
|     | about 0.5 t/h residue, 195° C. | | |

The abbreviation Hu signifies sensible heat.

It will be understood that each of the elements described above, or two or more together, may also find a useful application in other types of processes differing from the types described above.

While the invention has been illustrated and described as embodied in a process for the elimination of waste water produced upon the desulfurization of coking oven gas by means of an organic oxygen carrier-containing washing solution, with simultaneous recovery of elemental sulfur, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a process for the elimination of H$_2$S-containing waste water produced upon the desulfurization of coking oven gas by means of a washing solution containing organic oxygen carrier with simultaneous recovery of elemental sulfur, of the type in which the waste water is decomposed in a combustion chamber in a reducing atmosphere at temperatures between about 1000° and 1100° C. and in the H$_2$S— and SO$_2$—containing exhaust gas in the combustion chamber the mole ratio of H$_2$S:SO$_2$ amounts to at least 2:1, the sulfur produced therewith is separated, the sensible heat of the exhaust gas is utilized for steam generation and finally the cooled and desulfurized exhaust gas is added to the coking oven gas before a pre-cooling thereof, the improvement comprising separating out sulfur from the washing solution in an oxidizer of a desulfurization plant and leading the separated sulfur into the combustion chamber together with the part of the washing solution which is discharged as waste water from the washing solution circulation, sulfur loading of the waste water amounting to up to about 370 kg sulfur per m$^3$ waste water.

2. Process according to claim 1, wherein the sulfur-containing exhaust gas leaving the combustion chamber is cooled in a waste heat boiler.

3. Process according to claim 2, wherein further cooling of said sulfur-containing exhaust gas is performed after said waste heat boiler in a sulfur condenser, said sulfur condenser being heated by pre-heated boiler feed water, from which sulfur condenser sulfur in liquid state is discharged.

4. Process according to claim 1, wherein the reaction in the combustion chamber ensues at a temperature of about 1050° C.

5. Process according to claim 1, wherein the reducing atmosphere in the combustion chamber is obtained by burning coking oven gas under air exclusion.

6. Process according to claim 1, wherein the reducing atmosphere in the combustion chamber is obtained by burning coking oven gas as well as ammonia vapors resulting from the coking oven gas treatment, under air exclusion.

7. Process according to claim 1, wherein exhaust air resulting in the oxidizer is lead into the combustion chamber.

8. Process according to claim 7, further comprising leading into said combustion chamber exhaust air resulting from the coking oven gas treatment.

9. Process according to claim 1, further comprising filtering sulfur-containing washing solution leaving the oxidizer, as much washing solution still adhering to the sulfur present as filter cake as must be discharged as waste water from the washing solution circulation, whereupon the moist filter cake is lead into the combustion chamber.

* * * * *